United States Patent
Kwon et al.

(10) Patent No.: US 10,354,098 B2
(45) Date of Patent: Jul. 16, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Seong-cheol Kwon, Daejeon (KR); Jong-oh Hur, Seoul (KR); Eun-ji Park, Suwon-si (KR); Sung-wook Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 102 days.

(21) Appl. No.: 15/702,950

(22) Filed: Sep. 13, 2017

(65) Prior Publication Data

US 2018/0096171 A1   Apr. 5, 2018

(30) Foreign Application Priority Data

Oct. 5, 2016   (KR) .................. 10-2016-0128553

(51) Int. Cl.
*G06F 21/84* (2013.01)
*G06F 3/0489* (2013.01)
(Continued)

(52) U.S. Cl.
CPC ............ *G06F 21/84* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 8,645,996 B2   2/2014   Heo et al.
9,177,162 B2  11/2015   Karroumi et al.
(Continued)

FOREIGN PATENT DOCUMENTS

JP   2006-343873   12/2006
JP   2014-211818   11/2014
(Continued)

OTHER PUBLICATIONS

International Search Report and Written Opinion dated Dec. 21, 2017 in counterpart International Patent Application No. PCT/KR2017/009815.
(Continued)

*Primary Examiner* — William J. Goodchild
(74) *Attorney, Agent, or Firm* — Nixon & Vanderhye, PC.

(57) ABSTRACT

Disclosed is a display apparatus including: a display; an input comprising circuitry configured to receive a key moving command for moving between keys of an on-screen keyboard displayed on the display and a key-group selecting command for selecting a key group of the on-screen keyboard; and a processor configured to control a user interface (UI) of the on-screen keyboard, the keyboard comprising a first key group including keys=corresponding to a plurality of letters and a second key group including keys=corresponding to a plurality of functions, to be displayed on the display, to control an input marker moving between first keys of the first key group in response to the key moving command and at least one dummy marker moving between second keys of the first key group to be displayed if the first key group is selected by the key-group selecting command, to control an input of the first key to be made if a first key corresponding to the input marker is selected, to control a function marker moving between keys of the second key group in response to the key moving
(Continued)

command to be displayed if the second key group is selected by the key-group selecting command, and to control a function of a key to be implemented if the key corresponding to the function marker is selected.

20 Claims, 9 Drawing Sheets

(51) Int. Cl.
*G06F 3/0482* (2013.01)
*G06F 21/83* (2013.01)
*G06F 3/0488* (2013.01)
*G06F 3/0484* (2013.01)
*H04N 5/44* (2011.01)

(52) U.S. Cl.
CPC ...... *G06F 3/04886* (2013.01); *G06F 3/04892* (2013.01); *G06F 21/83* (2013.01); *G06F 2221/031* (2013.01); *H04N 5/4403* (2013.01)

(56) References Cited

U.S. PATENT DOCUMENTS

| | | | |
|---|---|---|---|
| 2004/0268250 A1* | 12/2004 | Danker | G06F 3/0236 715/210 |
| 2011/0055873 A1 | 3/2011 | Heo et al. | |
| 2014/0315519 A1 | 10/2014 | Nielsen | |

FOREIGN PATENT DOCUMENTS

| | | |
|---|---|---|
| JP | 2015-111319 | 6/2015 |
| KR | 10-2009-0076694 | 7/2009 |
| KR | 10-2010-0084928 | 7/2010 |

OTHER PUBLICATIONS

Extended Search Report and dated Apr. 5, 2019 in counterpart European Patent Application No. 17858616.0.

* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2016-0128553 filed on Oct. 5, 2016 in the Korean Intellectual Property Office, the disclosure of which is incorporated by reference herein in its entirety.

BACKGROUND

Field

The present disclosure relates generally to a display apparatus and a control method thereof, and for example, to a display apparatus for providing a security function of an on-screen keyboard and a control method thereof.

Description of Related Art

For data input of a computer or the like electronic apparatus, a hardware keyboard is generally used. In recent, the hardware keyboard has been replaced with a software on-screen keyboard by taking a user's convenience into account in case of a TV or the like large electronic apparatus.

If a user inputs sensitive information through the on-screen keyboard in the same space as a third party, the input information may be exposed to a third party through a pointer displayed on the on-screen keyboard like shoulder surfing.

To prevent or avoid such exposure of the input information, there has been disclosed technology of generating a dummy pointer in addition to an actual pointer and making it difficult for a third party to identify the actual pointer.

However, although the dummy pointer is used in the on-screen keyboard, there is a problem that it is possible to figure out the input information by tracing a moving path of the actual pointer back if a function key such as Caps Lock, Shift, Kor, etc. has to be selected.

SUMMARY

Accordingly, an aspect of one or more example embodiments may provide a display apparatus and a control method thereof, in which input information is prevented and/or avoided from being exposed to a third party when a letter key is input through an on-screen keyboard.

Further, another aspect of one or more example embodiments may provide a display apparatus and a control method thereof, which input information about a letter key being input is prevented and/or avoided from being exposed when a letter key is switched over to a function key through the on-screen keyboard.

According to an example embodiment, a display apparatus is provided, including: a display; an input configured to receive a key moving command for moving between keys of an on-screen keyboard displayed on the display and a key-group selecting command for selecting a key group of the on-screen keyboard; and a controller configured to control a user interface (UI) of the on-screen keyboard, which includes a first key group including keys respectively corresponding to a plurality of letters and a second key group including keys respectively corresponding to a plurality of functions, to be displayed on the display, to control an input marker moving between first keys of the first key group in response to the key moving command and at least one dummy marker moving between second keys of the first key group to be displayed if the first key group is selected by the key-group selecting command, to control an input of the first key to be made if a first key is selected corresponding to the input marker, to control a function marker moving between keys of the second key group in response to the key moving command to be displayed if the second key group is selected by the key-group selecting command, and to control a function of a key to be implemented if the key is selected corresponding to the function marker.

According to this example embodiment, it is possible to prevent and/or avoid input information from being exposed to a third party when a letter key is input through the on-screen keyboard. Further, it is possible to prevent and/or avoid the input information about the letter key being input from being exposed when an input is switched over from the letter key to the function key.

The input may include a remote controller including a plurality of buttons. Thus, at least one button of the remote controller may be used to select the letter key group or the function key group on the on-screen keyboard.

The controller may control the function marker to be marked on a predetermined key of the second key group if the second key group is selected in response to the key-group selecting command. Thus, when the function key group is selected on the on-screen keyboard, the pointer being displayed in the letter key group is not displayed but a pointer or highlight is displayed with respect to one preset function key, thereby preventing and/or avoiding the input information about the just previously input letter key from being exposed.

The predetermined key of the second key group may correspond to at least one of a default key, a randomly selected key, a key just previously used by a user and a key used more frequently than a predetermined number of times. Thus, when the function key group is selected on the on-screen keyboard, a default function key or a function key frequently used by a user is marked with a pointer or highlight, and it is therefore more convenient for a user.

The controller may control the function marker in the second key group and the at least one dummy function marker moving between the keys of the second key group to be displayed if the second key group is selected by the key-group selecting command. Thus, when the function key group is selected on the on-screen keyboard, the dummy pointer is used so that a third party cannot figure out which function key is selected.

The controller may control the input marker and at least one dummy marker to be displayed in the first key group if the key is selected corresponding to the function marker. Thus, if a user selects a certain function key on the on-screen keyboard, the actual pointer and one or more dummy pointers are immediately displayed in the letter key group so that a third party cannot figure out which letter key an input is made corresponding to.

The controller may control a region of the first key group where the input marker and at least one dummy marker are movable and a region of the second key group where the function marker is movable to be displayed on the UI of the on-screen keyboard. Thus, a user can visually check the region where the pointer is movable within each of the letter key group and the function key group.

The controller may control the at least one dummy marker to move in a direction different from a direction where the input marker moves within the first key group. Thus, when the letter key is input on the on-screen keyboard, the moving direction of the pointer is not exposed to a third party.

The controller may control the at least one dummy marker to move successively in an ongoing second direction if the input marker moves two or more times successively in a first direction. Thus, when the letter key is input on the on-screen keyboard, the moving path of the pointer is not exposed to a third party even though the pointer moves successively in one direction.

According to an example embodiment, a method of controlling a display apparatus is provided, the method including: displaying a user interface (UI) of the on-screen keyboard, which includes a first key group including keys respectively corresponding to a plurality of letters and a second key group including keys respectively corresponding to a plurality of functions; displaying an input marker moving between first keys of the first key group in response to the key moving command and at least one dummy marker moving between second keys of the first key group if the first key group is selected by the key-group selecting command; making an input of the first key if a first key is selected corresponding to the input marker; displaying a function marker moving between keys of the second key group in response to the key moving command if the second key group is selected by the key-group selecting command; and implementing a function of a key if the key is selected corresponding to the function marker.

According to this example embodiment, it is possible to prevent and/or avoid input information from being exposed to a third party when a letter key is input through the on-screen keyboard. Further, it is possible to prevent and/or avoid the input information about the letter key being input from being exposed when an input is switched over from the letter key to the function key.

The key moving command and the key-group selecting command may be issued by a remote controller including a plurality of buttons. Thus, at least one button of the remote controller may be used to select the letter key group or the function key group on the on-screen keyboard.

The displaying the function marker may include marking the function marker on a predetermined key of the second key group if the second key group is selected in response to the key-group selecting command. Thus, when the function key group is selected on the on-screen keyboard, the pointer being displayed in the letter key group is not displayed but a pointer or highlight is displayed with respect to one preset function key, thereby preventing and/or avoiding the input information about the just previously input letter key from being exposed.

The predetermined key of the second key group may correspond to at least one of a default key, a randomly selected key, a key just previously used by a user and a key used more frequently than a predetermined number of times. Thus, when the function key group is selected on the on-screen keyboard, a default function key or a function key frequently used by a user is marked with a pointer or highlight, and it is therefore more convenient for a user.

The method further may include: displaying the function marker in the second key group and at least one dummy function marker moving between the keys of the second key group if the second key group is selected by the key-group selecting command. Thus, when the function key group is selected on the on-screen keyboard, the dummy pointer is used so that a third party cannot figure out which function key is selected.

The method may further include: displaying the input marker and the at least one dummy marker in the first key group if the key is selected corresponding to the function marker. Thus, if a user selects a certain function key on the on-screen keyboard, the actual pointer and one or more dummy pointers are immediately displayed in the letter key group so that a third party cannot figure out which letter key an input is made corresponding to.

The method further may include: displaying a region of the first key group where the input marker and at least one dummy marker are movable and a region of the second key group where the function marker is movable, on the UI of the on-screen keyboard. Thus, a user can visually check the region where the pointer is movable within each of the letter key group and the function key group.

The method may further include: controlling the at least one dummy marker to move in a direction different from a direction where the input marker moves within the first key group. Thus, when the letter key is input on the on-screen keyboard, the moving direction of the pointer is not exposed to a third party.

The method may further include: controlling the at least one dummy marker to move successively in an ongoing second direction if the input marker moves two or more times successively in a first direction. Thus, when the letter key is input on the on-screen keyboard, the moving path of the pointer is not exposed to a third party even though the pointer moves successively in one direction.

BRIEF DESCRIPTION OF THE DRAWINGS

The above and/or other aspects, features an attendant advantages of the present disclosure will become apparent and more readily appreciated from the following detailed description, taken in conjunction with the accompanying drawings, in which like reference numerals refer to like elements, and wherein.

DETAILED DESCRIPTION

Hereinafter, various example embodiments will be described in detail with reference to accompanying drawings so as to be easily understood by a person having ordinary knowledge in the art to which the example embodiments pertain. The present disclosure may be achieved in various forms and not limited to the following embodiments. For clear description, like numerals refer to like elements throughout.

Figure 1:
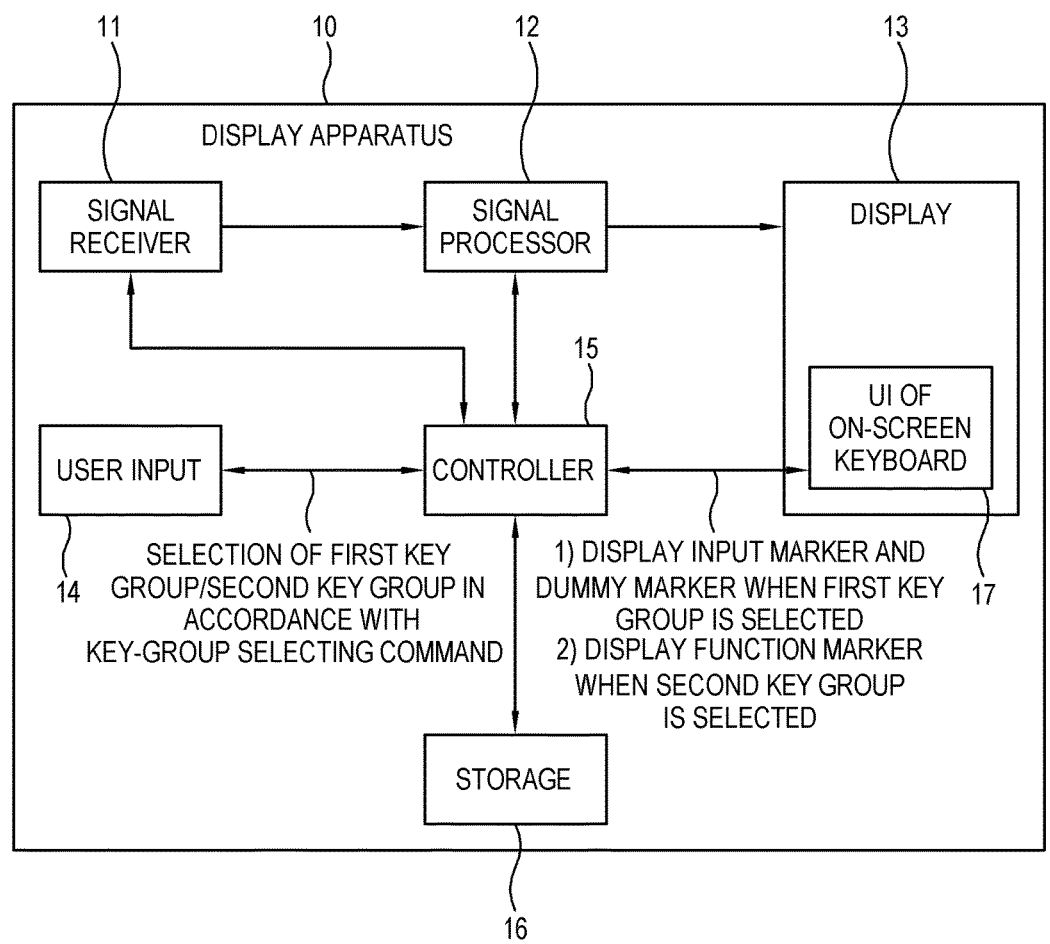
FIG. 1 is a block diagram illustrating an example display apparatus according to an example embodiment.

Below, features and example embodiments of a display apparatus 10 will be first described with reference to FIG. 1 to FIG. 8. FIG. 1 is a block diagram illustrating an example display apparatus according to an example embodiment. As illustrated in FIG. 1, a display apparatus 10 according to this example embodiment includes a signal receiver (e.g., including receiving circuitry) 11, a signal processor (e.g., including processing circuitry) 12, a display 13, a user input (e.g., including input circuitry) 14, a controller (e.g., including processing circuitry) 15 and a storage 16. For example, the display apparatus 10 may be achieved, for example, and without limitation, by a television (TV), a smart phone, a tablet personal computer, a computer, or the like. According to an example embodiment, an on-screen keyboard is displayed as a user interface (UI) 17 on the display 13. The elements of the display apparatus 10 are not limited to the foregoing descriptions, and may exclude some elements or include some additional elements.

According to an example embodiment, the display apparatus 10 displays the UI 17 of the on-screen keyboard, which has a first key group including keys respectively corresponding to a plurality of letters and a second key group including keys respectively corresponding to a plurality of functions on the display 13. If the first key group is selected in response to a key group command of the user input 14, the display apparatus 10 displays an input maker moving between first keys of the first key group in response to a key moving command of the user input 14, and at least one dummy marker moving between second keys of the first key group. If a first key is selected corresponding to the input marker, the display apparatus 10 controls the first key to be input.

If the second key group is selected in response to a key group command of the user input 14, the display apparatus 10 displays a function maker moving between keys of the second key group in response to a key moving command of the user input 14. If a key is selected corresponding to a function marker, the display apparatus 10 controls a function of the selected key to be performed.

The signal receiver 11 may include various receiving circuitry and receives a broadcast signal or an image signal. The signal receiver 11 may be implemented in various forms in accordance with formats of a receiving broadcast signal and a receiving image signal and the types of the display apparatus 10. For example, and without limitation, the signal receiver 11 may be achieved by a tuner for receiving a radio frequency (RF) broadcast signal from a broadcasting station or a satellite signal. Alternatively, the signal receiver 11 may receive an image signal and data from a high definition multimedia interface (HDMI) apparatus such as a digital versatile disc (DVD) player, a game console, a personal computer (PC), etc.

The signal processor 12 may include various processing circuitry and performs image processes preset with regard to a broadcast or image signal received in the signal receiver 11. As an example of image processes performed in the signal processor 12, there are de-multiplexing, decoding, de-interlacing, scaling, noise reduction, detail enhancement, or the like, without limitation. The signal processor 12 may be implemented by a system on chip (SoC) where many functions are integrated, or an image processing board where individual modules for independently performing respective processes are mounted.

The display 13 displays an image based on a broadcast or image signal processed by the signal processor 12. The display 13 may be achieved by various types. For example, and without limitation, the display 13 may be achieved by a plasma display panel (PDP), a liquid crystal display (LCD), an organic light emitting diode (OLED), a flexible display, or the like.

The user input 14 may include various circuitry that receives a user's input for controlling at least one function of the display apparatus 10. According to an example embodiment, the user input 14 receives a key moving command for moving between the keys of the on-screen keyboard, a key-group selecting command for selecting the key group of the on-screen keyboard, and a key input command for inputting a key of the on-screen keyboard, with regard to the UI 17 of the on-screen keyboard displayed on the display 13.

The user input 14 may be achieved, for example, and without limitation, by a remote controller that uses infrared to communicate with the display apparatus 10 and includes a plurality of buttons. Further, the user input 14 may be achieved by a keyboard, a mouse and the like connecting with the display apparatus 10, a touch screen provided on the display apparatus 10, or an input panel provided on an outer side of the display apparatus 10.

According to an example embodiment, if the remote controller is used as the user input 14, the key moving command, the key-group selecting command and the key input command through the UI 17 of the on-screen keyboard may be input by at least one button among the plurality of buttons provided in the remote controller. For example, regarding the UI 17 of the on-screen keyboard, the key moving command may be issued by a direction button among a plurality of buttons of the remote controller, and the key input command may be issued by an 'Enter' button or an 'Ok' button. Further, the key-group selecting command may be issued by toggling one function button or selecting one between two function buttons among the plurality of buttons of the remote controller.

In such a case where the remote controller is employed as the user input 14, the method of issuing the key moving command, the key-group selecting command and the key input command is not limited to those of the foregoing example embodiments, but may vary depending a function of a button previously set in the remote controller and a function of a button set by a user.

The storage 16 stores setting information about a key marked with a function marker when the second key group including the keys respectively corresponding to the plurality of functions is selected on the UI 17 of the on-screen keyboard. According to an example embodiment, the setting information about the key marked with the function marker may be set by a default value or by a user's input when the UI 17 of the on-screen keyboard is set. Alternatively, the storage 16 may store a use history of a user with regard to each of the plurality of keys in the second key group, so that the function marker can be marked on a key just previously used by a user or a key frequently used by a user when the second key group is selected.

The storage 16 may store setting information about a first key marked with the input marker and the second keys marked with at least one dummy marker when the first key group including the keys respectively corresponding to the plurality of letters is selected. Even in this case, the setting information about the first key marked with the input marker and the second key marked with the dummy marker may be set by a default value or by a user's input.

The controller 15 may include various processing circuitry and controls the display 13 to display the UI 17 of the on-screen keyboard, which has the first key group including the keys respectively corresponding to the plurality of letters and the second key group including the keys respectively corresponding to the plurality of functions. That is, the first key group includes a plurality of letter keys for inputting a letter, a numeral, a symbol, etc. On the other hand, the second key group includes a plurality of function keys for implementing a predetermined function such as Caps, Kor, Enter, Space, etc.

The controller 15 controls the display 13 to display 13 to display the input marker moving between the first keys of the first key group and at least one dummy marker moving between the second keys of the first key group in response to the key moving command received in the user input 14 if the first key group is selected by the key-group selecting command received in the user input 14. While the input marker moves between the first keys, at least one dummy marker moves between the second keys different in position from the first key in the first key group. Thus, input information about a letter being input by a user through the on-screen keyboard is prevented from and/or avoids being exposed to a third party.

Figure 3:
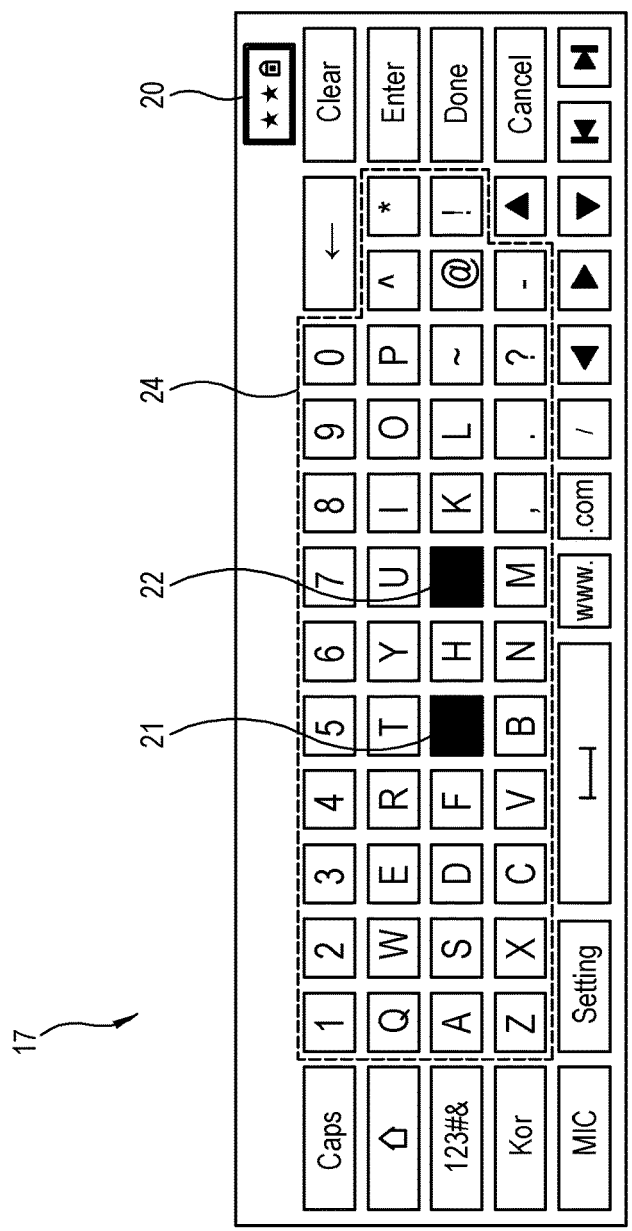
FIG. 3 is a diagram illustrating an example of displaying an input marker and a dummy marker in the first key group according to an example embodiment.

For example, as illustrated in FIG. 3, if a letter key group 24 is activated by a user's input on the UI 17 of the on-screen keyboard, an input pointer 21 moving corresponding to a user's input and a dummy pointer 22 moving to a random position regardless of a user's input are displayed within a region of the letter key group 24. At this time, the dummy pointer 22 is displayed at a position different from that of the input pointer 21 within the letter key group 24.

Figure 6:
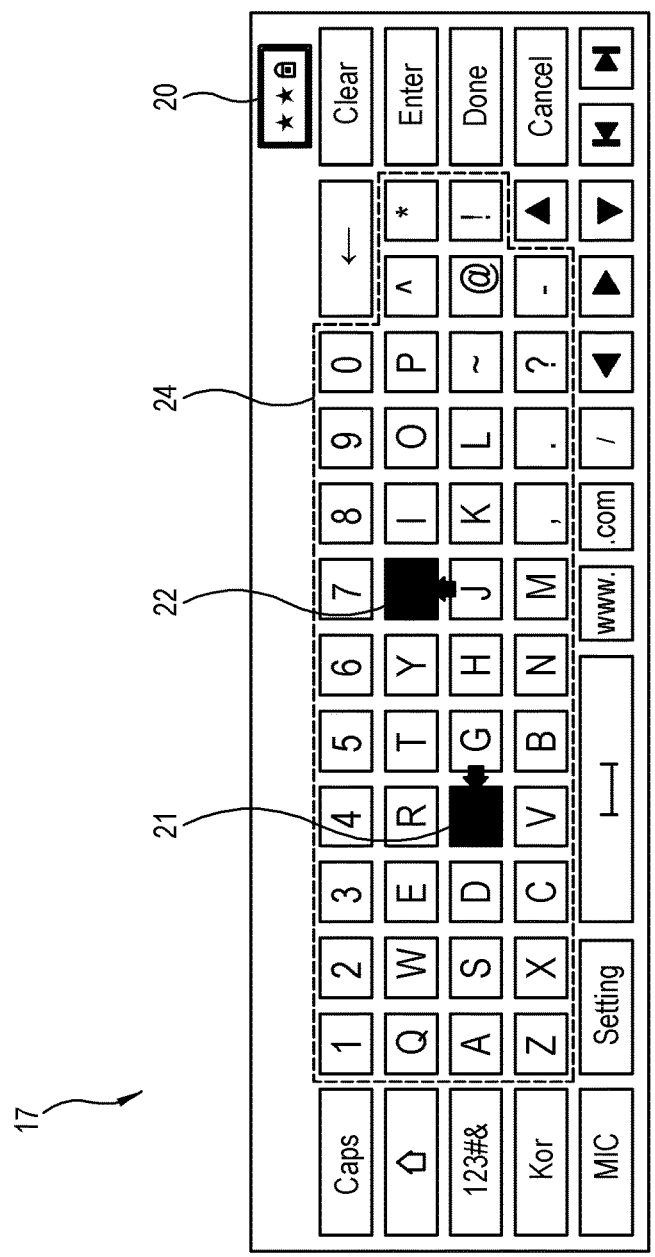
FIG. 6 is a diagram illustrating an example in which the dummy marker is moved in a different direction from that of the input marker in the first key group according to an example embodiment.

According to an example embodiment, the controller 15 may control at least one dummy marker to move in a direction different from the moving direction of the input marker within the first key group. For example, as illustrated in FIG. 6, on the UI 17 of the on-screen keyboard, if the input pointer 21 moves from 'G' to 'F' in a leftward direction in the state that the letter key group 24 is activated, the dummy pointer 22 moves from 'J' to 'U' in a upward direction. At this time, the moving direction of the dummy pointer 21 may move in other directions than the moving direction of the input pointer 21.

Like this, the dummy marker moves in a direction different from the direction where the input marker moves corresponding to a user's input, and it is thus possible to prevent the moving direction of the input marker from being exposed to a third party.

Figure 7:
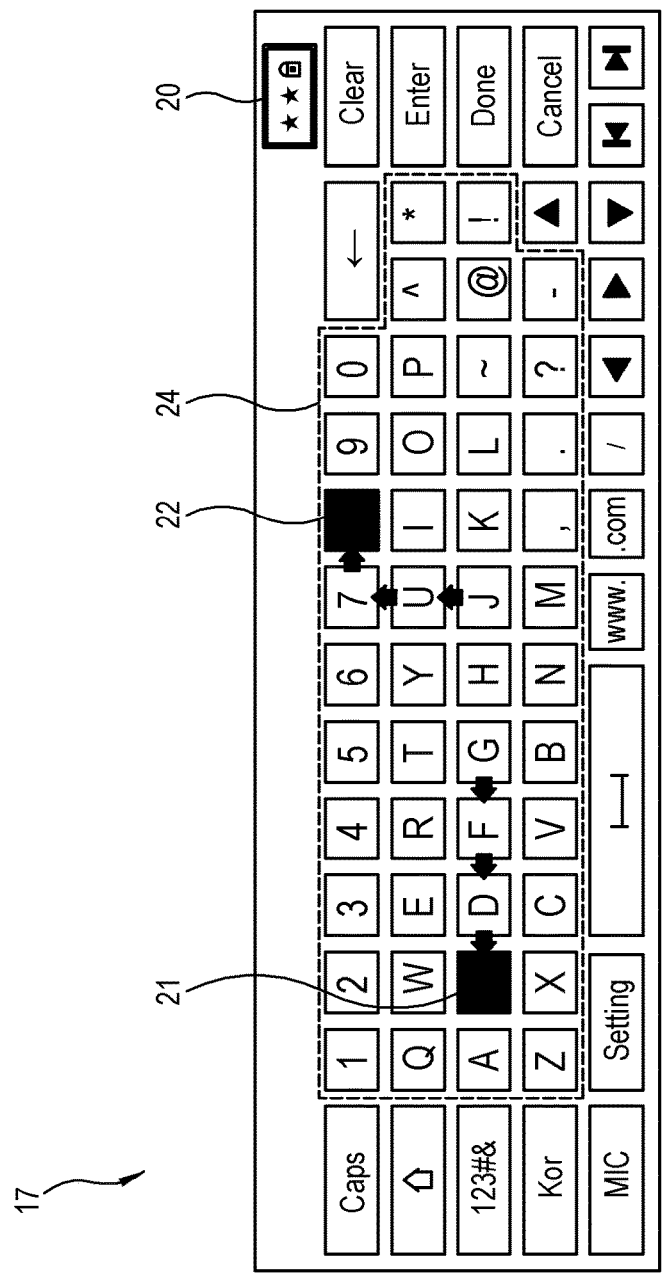
FIG. 7 is a diagram illustrating an example of directions where the dummy marker moves when the input marker successively moves in one direction according to an example embodiment.

According to an example embodiment, if the input marker moves two or more steps successively in a first direction, the controller 15 may control at least one dummy marker to move successively in a second direction where the dummy marker has been moving. For example, as illustrated in FIG. 7, on the UI 17 of the on-screen keyboard, if the input pointer 21 moves two steps successively from 'G' to 'D' in the leftward direction in the state that the letter key group 24 is activated, the dummy pointer 22 also moves two steps successively from 'J' to '7' in the upward direction. Subsequently, if the input pointer 21 moves one step from 'D' to 'S' in the leftward direction, the dummy pointer 22 moves from '7' to '8' in a rightward direction different from the ongoing direction since '7' is positioned at the uppermost end of the letter key group 24.

Like this, if the input marker moves successively in one direction, the dummy marker also moves successively in the ongoing direction, thereby preventing the moving path of the input marker from being exposed to a third party.

The controller 15 may control the first key to be input if the first key corresponding to the input marker is selected by the key input command of the user input 14 in the state that the input marker and at least one dummy marker are displayed as the first key group is selected.

The controller 15 displays the function marker moving between the keys of the second key group in response to the key moving command of the user input 14 if the second key group is selected by the key-group selecting command of the user input 14.

According to an example embodiment, the controller 15 may mark the function marker on a predetermined key of the second key group if the second key group is selected by the key-group selecting command. Here, a predetermined key of the second key group may correspond to at least one of a default key, a random key, a key just previously used by a user, and a key used more frequently than a predetermined number of times. For example, as illustrate in FIG. 4, when a user selects a function key group 25 by a button input of the remote controller in the state that the input pointer 21 and the dummy pointer 22 are being displayed in the letter key group 24 on the UI 17 of the on-screen keyboard, the input pointer 21 and the dummy pointer 22 being displayed in the letter key group 24 are not displayed anymore, and a function pointer 23 is displayed at a position of 'Caps Lock' in the function key group 25. At this time, 'Caps Lock' marked with the function pointer 23 may correspond to the default key or the key frequently used by a user.

Like this, when the second key group including the plurality of function keys is selected on the on-screen keyboard, the pointers being displayed in the first key group including the plurality of letter keys are not displayed any more, but the pointers are displayed with regard to a preset function key of the second key group, thereby preventing the input information about the just previously input letter key from being exposed. Further, if the preset function key is the function key frequently used by a user, it is more convenient for a user.

Figure 8:
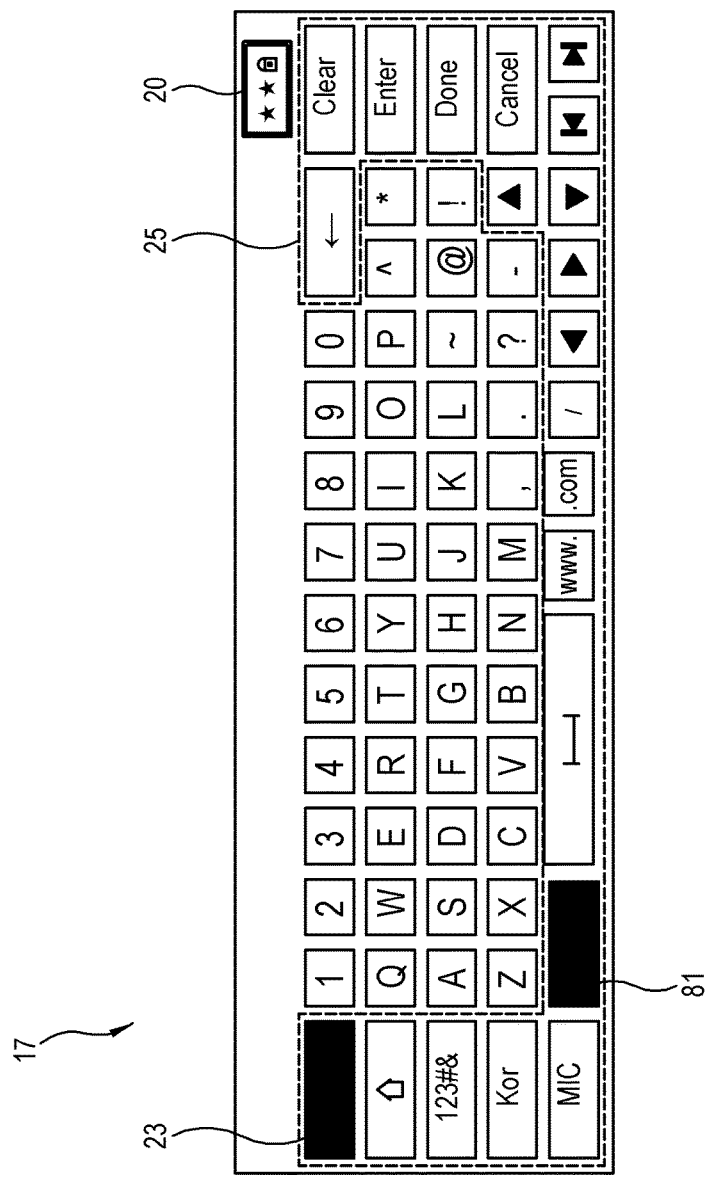
FIG. 8 is a diagram illustrating an example of displaying a function marker and a dummy function marker in the second key group according to an example embodiment.

According to an example embodiment, the controller 15 may control the function marker and at least one dummy function marker moving between the keys of the second key group to be displayed in the second key group. For example, as illustrated in FIG. 8, when a user selects the function key group 25 by a button input of the remote controller in the state that the input pointer 21 and the dummy pointer 22 are being displayed in the letter key group 24 on the UI 17 of the on-screen keyboard, the input pointer 21 and the dummy pointer 22 being displayed on the letter key group 24 are not displayed anymore, and the function pointer 23 is displayed at a position of 'Caps Lock' in the function key group 25 and a dummy function pointer 81 is displayed at a position of 'Setting'. At this time, the function pointer 23 moves corresponding to a user's input, and the dummy function pointer 81 moves to a random position in the function key group 25 regardless of a user's input. Further, the dummy function pointer 81 may be displayed at a position different from that of the function pointer 23 within the function key group 25.

Figure 4:
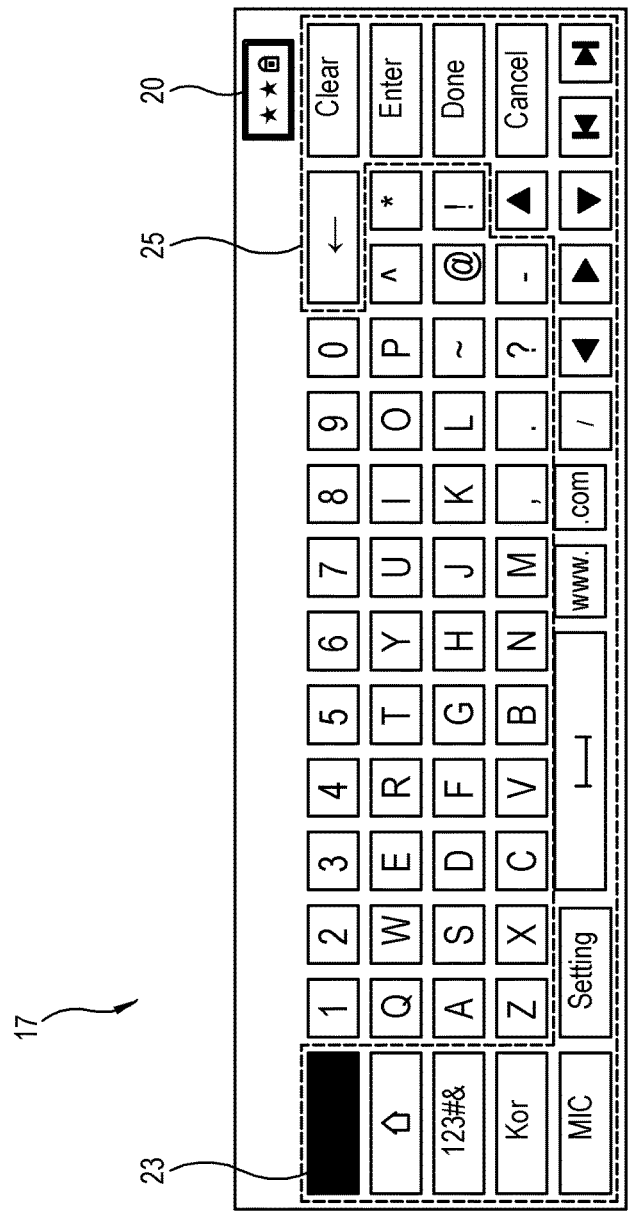
FIG. 4 is a diagram illustrating an example of displaying a function marker in the second key group according to an example embodiment.

If a key corresponding to the function marker is selected while the function marker is displayed in the second key group as described above, the controller 15 performs a function corresponding to the selected key. For example, if 'Caps Lock' is selected in response to the key input command while the function pointer 23 is displayed at the position of 'Caps Lock' in the function key group 25 as shown in FIG. 4, a function of shifting the plurality of letter keys in the letter key group 24 into capital letters is performed.

According to an example embodiment, the controller 15 may control the input marker and at least one dummy marker to be displayed in the first key group if the key corresponding to the function marker is selected. That is, if a certain key corresponding to the function marker is selected in response to the key input command of the user input 14 in the state that the function marker is being displayed in the second key group, the input marker and at least one dummy marker may be displayed in the first key group after performing the function of the selected key.

Thus, if a user selects a certain function key on the on-screen keyboard, the actual pointer and one or more dummy pointers are displayed in the letter key group directly after performing the corresponding function, thereby preventing and/or avoiding a third party from figuring out which pointer the actual input corresponds to.

Figure 5:
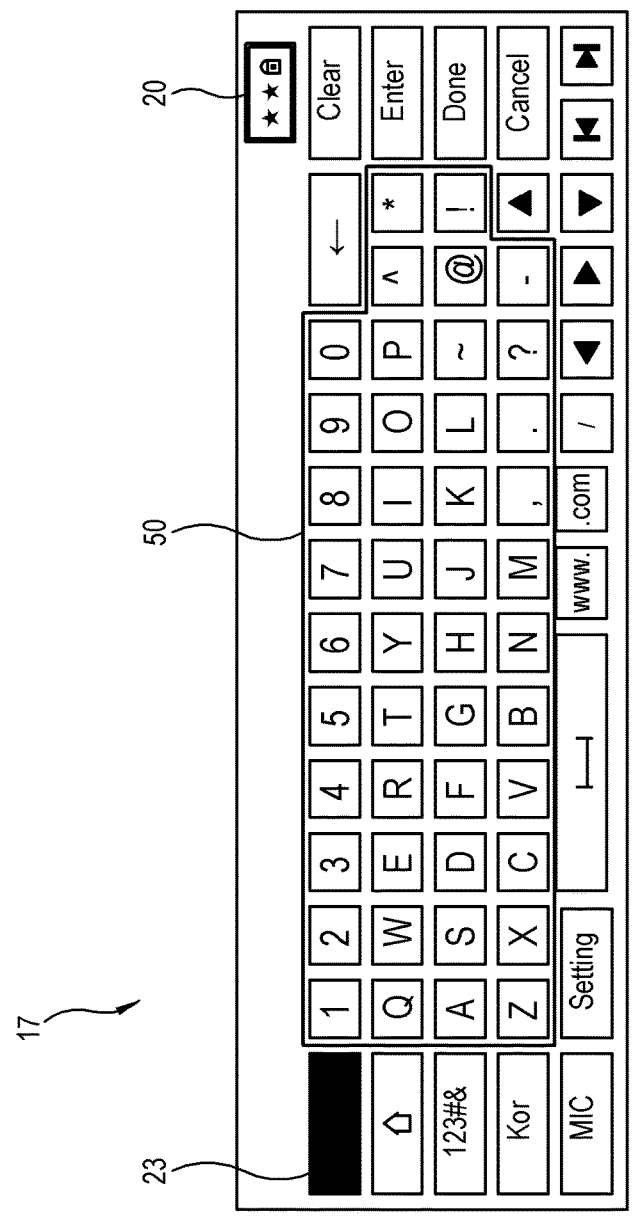
FIG. 5 is a diagram illustrating an example of distinguishably displaying a region where a pointer is movable in the first key group and the second key group according to an example embodiment.

According to an example embodiment, the controller 15 may control the region of the first key group, in which the input marker and at least one dummy marker are movable, and the region of the second key group, in which the function marker is movable, to be displayed on the UI 17 of the on-screen keyboard. For example, as illustrated in FIG. 5, the controller 15 controls a region distinguishing line 50 to be displayed for allowing a user to distinguish between the region of the letter key group 24 and the region of the function key group 25 on the UI 17 of the on-screen keyboard. Thus, a user can visually check the regions where the pointer is movable within the letter key group 24 and the function key group 25.

As described above, the display apparatus 10 according to an example embodiment has an effect on preventing and/or avoiding exposure of the input information to a third party when a letter key is input on the on-screen keyboard. Further, it is possible to effectively prevent and/or avoid exposing the input information about the letter key being input when the letter key is switched over to the function key.

Figure 2:
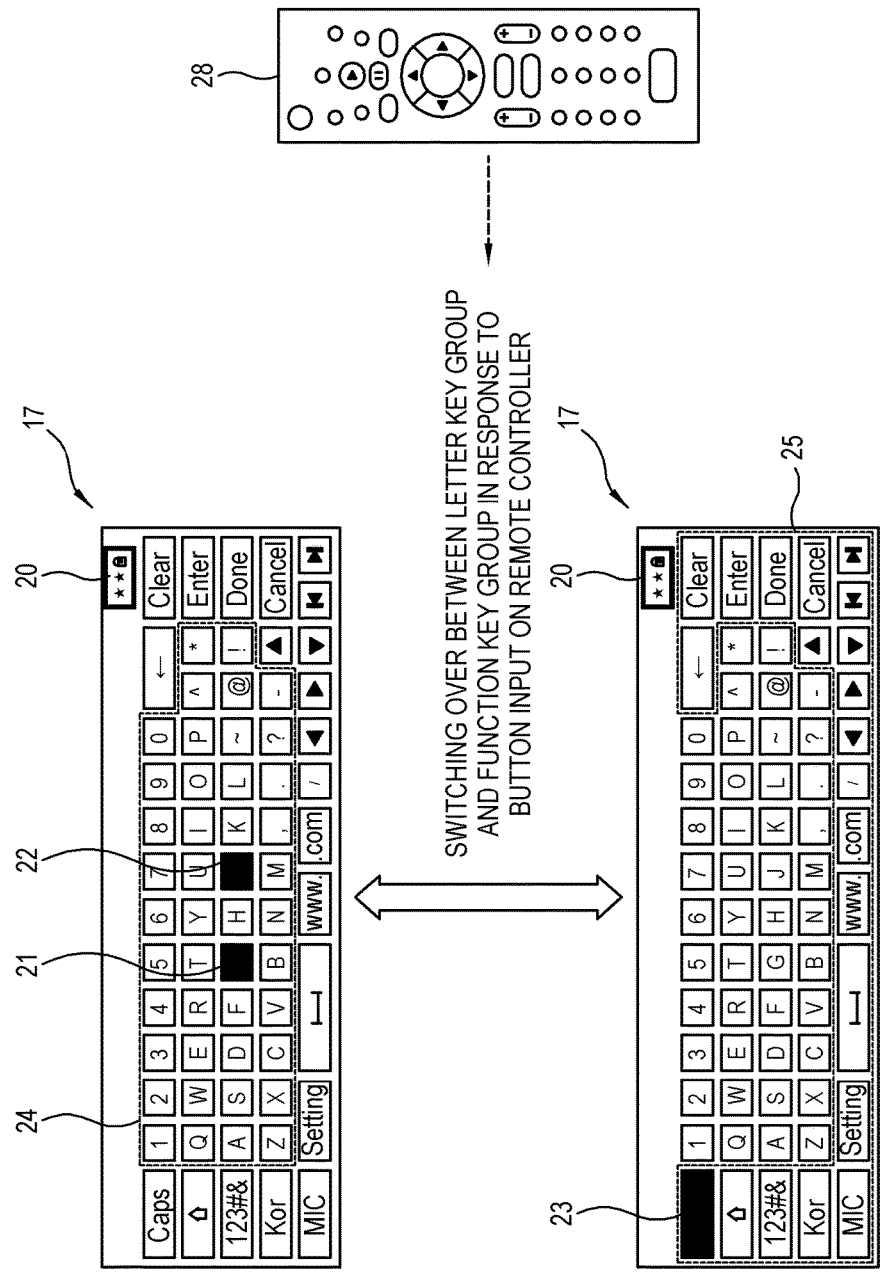
FIG. 2 is a diagram illustrating an example of switching over between a first key group and a second key group in response to a user's input according to an example embodiment.

FIG. 2 is a diagram illustrating an example in which the first key group and the second key group are switched over to each other in response to a user's input according to an example embodiment. As illustrated in FIG. 2, the letter key group 24 including the plurality of letter keys and the function key group 25 including the plurality of function keys are switched over to each other in response to a user's input on the UI 17 of the on-screen keyboard. For example, if a security function key 20 for providing a security function to the UI 17 of the on-screen keyboard is activated in response to a user's input, the letter key group 24 is activated to allow a user to make an input. At this time, the input pointer 21 moving corresponding to a user's input, and the dummy pointer 22 randomly moving regardless of a user's input are displayed in the letter key group 24, thereby preventing exposure of a user's input information.

In the foregoing state that the letter key group 24 is activated, the function key group 25 is activated by making a predetermined button input of a remote controller 28. For example, the letter key group 24 is switched over to the function key group 25 in response to selection of one preset button among the plurality of buttons provided in the remote controller 28. At this time, the function pointer 23 is displayed with regard to a predetermined function key in the function key group 25. Further, if the preset button of the remote controller 28 is selected again in the state that the function key group 25 is activated, the function key group 25 may be switched over to the letter key group 24.

According to an example embodiment, the letter key group 24 and the function key group 25 may be switched over to each other in response to selection of two or more preset buttons among the plurality of buttons provided in the remote controller 28. That is, the letter key group 24 may be switched over to the function key group 25 in response to selection of one between the two preset buttons of the remote controller 28, and the function key group 25 may be switched over to the letter key group 24 in response to selection of the other one between the two preset buttons.

Alternatively, the letter key group 24 and the function key group 25 may be switched over to each other by various input units as well as the remote controller 28. For example, if a mouse is used as the input unit, the letter key group 24 and the function key group 25 may be switched over to each other by clicking a right button of the mouse.

According to this example embodiment, the input information is prevented from and/or avoids being exposed to a third party even though the pointer moves while inputting the letter key and the function key on the on-screen keyboard.

FIG. 3 is a diagram illustrating an example of displaying the input marker and the dummy marker in the first key group according to an example embodiment. As illustrated in FIG. 3, if the security function key 20 is activated by a user's input on the UI 17 of the on-screen keyboard, the letter key group 24 including keys respectively a plurality of letter, numerals and symbols is activated to receive an input.

According to an example embodiment, the letter key group 24 may be for example activated by making a predetermined button input on the remote controller 28, or by clicking a middle or right button of the mouse.

When the letter key group 24 is activated, the input pointer 21 moving corresponding to a user's input is displayed at a position of 'G' and the dummy pointer 22 moving randomly regardless of a user's input is displayed at a position of 'J' within the region of the letter key group 24. At this time, the dummy pointer 22 is displayed at a position different from that of the input pointer 21 within the letter key group 24, thereby preventing and/or avoiding a third party from figuring out which pointer the actual input corresponds to.

FIG. 4 is a diagram illustrating an example of displaying the function marker in the second key group according to an example embodiment. As illustrated in FIG. 4, if the function key group 25 is activated in response to a user's input in the state that the input pointer 21 and the dummy pointer 22 are being displayed in the letter key group 24 on the UI 17 of the on-screen keyboard, the function pointer 23 is displayed at a position of a predetermined key in the function key group 25.

For example, when a user selects the function key group 25 by making a button input on the remote controller, the input pointer 21 and the dummy pointer 22 being displayed in the letter key group 24 are not displayed any more, and the function pointer 23 is displayed at a position of 'Caps Lock' in the function key group 25.

If the input pointer 21 is moved to select 'Caps Lock' while the input pointer 21 and the dummy pointer 22 are displayed in the letter key group 24, the moving path of the input pointer 21 may be visually displayed and thus the input information may be exposed. Therefore, when the function key group 25 is selected, the input pointer 21 and the dummy pointer 22 are not displayed and only the function pointer 23 is immediately displayed in the function key group 25, thereby preventing the input information about the just previously input letter key from being exposed.

FIG. 5 is a diagram illustrating an example of distinguishably displaying a region where a pointer is movable in the first key group and the second key group according to an example embodiment. As illustrated in FIG. 5, the region distinguishing line 50 for allowing a user to distinguish between the region of the letter key group 24 and the region of the function key group 25 on the UI 17 of the on-screen keyboard is displayed. For example, when the letter key group 24 is activated, the region distinguishing line 50 is displayed to inform a user that the input pointer 21 and the dummy pointer 22 are movable within the region of the letter key group 24 partitioned by the region distinguishing line 50. Further, when the function key group is activated, the region distinguishing line 50 is displayed to inform a user that the function pointer 23 is movable within the region of the function key group 25 partitioned by the region distinguishing line 50.

Besides, when a user moves the input pointer 21 being displayed in the letter key group 24 and makes the input pointer 21 reach a boundary area of the letter key group 24, the region distinguishing line 50 may be displayed to inform a user that the input pointer 21 cannot go forward any more. Further, when the user moves the function pointer 23 being displayed in the function key group 25 and makes the function pointer 23 reach a boundary area of the function key group 25, the region distinguishing line 50 may be displayed to inform the user that the function pointer 23 cannot go forward any more.

Alternatively, UIs for distinguishing between the respective areas may be separately displayed with respect to the letter key group 24 and the function key group 25. For example, a first area distinguishing line (not shown) may be displayed at a boundary of the letter key group 24, and a second area distinguishing line (not shown) may be displayed at a boundary of the function key group 25. Thus, a user can be informed of the region where the pointer is movable with respect to each of the letter key group 24 and the function key group 25.

FIG. 6 is a diagram illustrating an example in which the dummy marker is moved in a different direction from that of the input marker in the first key group according to an example embodiment. As illustrated in FIG. 6, in the state that the letter key group 24 is activated in response to a user's input on the UI 17 of the on-screen keyboard, the input pointer 21 is displayed at a position of 'G', and the dummy pointer 22 is displayed at a position of 'J'. At this time, the letter key group 24 may be for example activated by making a predetermined button input on the remote controller 28 or by clicking a middle or right button of the mouse.

The input pointer 21 is an actual pointer that moves corresponding to a user's input, but the dummy pointer 22 is a fake pointer that moves within the letter key group 24 in a random direction regardless of a user's input. In the example shown in FIG. 6, one dummy pointer 22 is prepared corresponding to the input pointer 21, but not limited thereto. Alternatively, two or more dummy pointers may be prepared. Further, the dummy pointer 22 may be moved at the same when the input pointer 21 moves, so that the input pointer 21 is not exposed to a third party.

For example, when the input pointer 21 moves from 'G' to 'F' in the leftward direction, the dummy pointer 22 moves from 'J' to 'U' in the upward direction. That is, the dummy pointer 22 does not move in the same direction as the input pointer 21, but moves in other directions than the moving direction of the input pointer 21, thereby preventing the moving direction of the input pointer 21 from being exposed to a third party.

According to the foregoing example embodiments, the dummy marker moves in a direction different from that of the input marker moving corresponding to a user's input, thereby having an effect on preventing and/or avoiding exposure of the moving direction of the input marker to a third party.

FIG. 7 is a diagram illustrating an example of directions where the dummy marker moves when the input marker successively moves in one direction according to an example embodiment. As illustrated in FIG. 7, in the state that the letter key group 24 is activated by a user's input on the UI of the on-screen keyboard, the input pointer 21 is displayed at a position of 'G' and the dummy pointer 22 is displayed at a position of 'J'. At this time, the letter key group 24 may be for example activated by making a predetermined button input on the remote controller 28 or clicking a middle or right button of the mouse.

The input pointer 21 is an actual pointer that moves corresponding to a user's input, but the dummy pointer 22 is a fake pointer that moves within the letter key group 24 in a random direction regardless of a user's input. The dummy pointer 22 may be moved at the same when the input pointer 21 moves, so that the input pointer 21 cannot be exposed to a third party.

According to an example embodiment, if the input pointer 21 successively moves in one direction, the dummy pointer 22 may move in one of other directions than the direction where the input pointer 21 moves. At this time, if the dummy pointer 22 moves successively in one direction and reaches the boundary of the letter key group 24 not to move forward in the same direction any more, the dummy pointer 22 may change the moving direction so as to move in another direction except the forward and backward directions.

For example, if the input pointer 21 moves two steps successively from 'G' to 'D' in the leftward direction, the dummy pointer 22 also moves two steps successively from 'J' to '7' in the upward direction. Subsequently, if the input pointer 21 moves one step from 'D' to 'S' in the leftward direction, the dummy pointer 22 moves from '7' to '8' in a rightward direction different from the ongoing direction since '7' is positioned at the uppermost end of the letter key group 24.

According to this example embodiment, if the input marker moves successively in one direction, the dummy marker also moves successively in the ongoing direction, thereby preventing and/or avoiding exposure of the moving path of the input marker to a third party.

FIG. 8 is a diagram illustrating an example of displaying a function marker and a dummy function marker in the second key group according to an example embodiment. As illustrated in FIG. 8, if the function key group 25 is activated in response to a user's input on the UI 17 of the on-screen keyboard in the state that the input pointer 21 and the dummy pointer 22 are being displayed in the letter key group 24, the function pointer 23 is displayed at a position of a predetermined key in the function key group 25, and the dummy function pointer 81 is displayed at a position different from that of the function pointer 23.

For example, if a user selects the function key group 25 by making a button input on the remote controller, the input pointer 21 and the dummy pointer 22 being displayed in the letter key group 24 are not displayed any more, and the function pointer 23 is displayed at a position of 'Caps Lock' in the function key group 25 and the dummy function pointer 81 is displayed at a position of 'Setting'. At this time, the function pointer 23 moves corresponding to a user's input, but the dummy function pointer 81 moves randomly within the function key group 25 regardless of a user's input. Further, the dummy function pointer 81 is displayed at a position different from that of the function pointer 23 within the function key group 25.

According to the foregoing example embodiment, when the function key group 25 is selected, the function pointer 23 and the dummy function pointer 81 are immediately displayed in the function key group 25 while stopping displaying the input pointer 21 and the dummy pointer 22, thereby preventing and/or avoiding exposure of the input information of the just previously input letter key. Further, the dummy function pointer 81 is displayed together with the function pointer 23, so that a third party cannot figure out which function key a user inputs.

Figure 9:
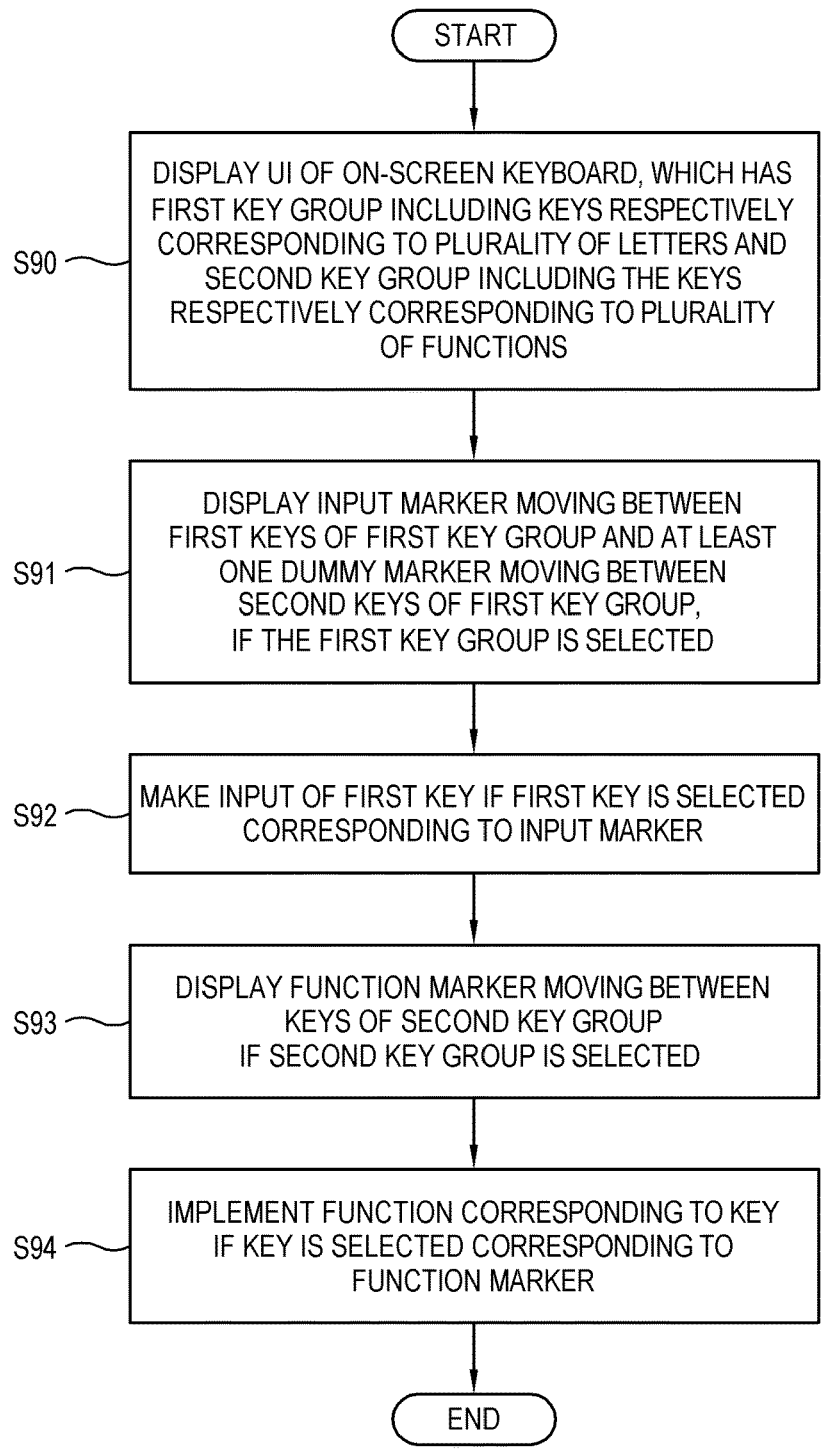
FIG. 9 is a flowchart illustrating an example method of controlling the display apparatus according to an example embodiment.

FIG. 9 is a flowchart illustrating an example method of controlling the display apparatus according to an example embodiment. As illustrated in FIG. 9, at operation S90, the UI of the on-screen keyboard, which has the first key group including the keys respectively corresponding to the plurality of letters and the second key group including the keys respectively corresponding to the plurality of functions, is displayed. That is, the first key group includes the plurality of letter keys for inputting the letters, numerals, symbols, etc., and the second key group includes the plurality of function keys for implementing a predetermined function such as Caps, Kor, Enter, Space, etc.

At operation S91, if the first key group is selected in response to the key-group selecting command, the input marker moving between the first keys of the first key group in accordance with the key moving command and at least one dummy marker moving between the second keys of the first key group are displayed. Here, the key moving command and the key-group selecting command may be issued by the remote controller including the plurality of buttons. That is, the key moving command and the key-group selecting command may be issued by making a preset button input among the plurality of buttons on the remote controller.

Here, the input marker moves corresponding to a user's input such as the key moving command, but the dummy marker moves to a random position regardless of a user's input. The dummy marker is displayed at a position different from that of the input marker, so that the input information caused by the input marker can be prevented from and/or avoids being exposed to a third party.

According to an example embodiment, at least one dummy marker may move in a direction different from the direction where the input maker moves, within the first key group. That is, a user can visually check the moving direction of the input marker since the dummy marker moves in one of directions other than the direction where the input marker moves. At this time, it is difficult for a third party to figure out which marker the actual input corresponds to since the input marker and the dummy marker move in directions different from each other.

According to an example embodiment, if the input marker moves two or more steps successively in the first direction, at least one dummy marker may also move successively in the ongoing second direction. That is, when the input marker moves successively in one direction, the dummy marker also moves successively in the ongoing direction in order to prevent and/or avoid exposing the moving path of the input marker to a third party.

According to an example embodiment, the UI of the on-screen keyboard may show the region of the first key group where the input marker and at least one dummy marker are movable, and the region of the second key group where the function marker is movable. For example, if the first key group is selected, a range of the first key group where the input marker and the dummy marker are movable may be represented with a line or region of certain color on the UI of the on-screen keyboard. Likewise, if the second key group is selected, a range of the second key group where the function marker is movable may be represented with a line or region of certain color on the UI of the on-screen keyboard. At this time, each range of the first key group and the second key group may appear to be represented with the line or region when the input or function marker being moved by a user reaches the boundary of each group and is not movable any more.

According to another example embodiment, if the security function of the on-screen keyboard is activated in response to a user's input, the region distinguishing line 50 may be displayed to distinguish between the first key group and the second key group. Thus, based on the region distinguishing line 50, a user can check the range where the input marker and the dummy marker are movable within the first key group and the range where the function marker is movable within the second key group.

At operation S92, if the first key corresponding to the input marker is selected, the first key is input. That is, if the first key is selected in response to the key input command while the input marker moving between the plurality of first keys in accordance with the key moving command is marked on a certain first key, the input of the selected first key is made.

At operation S93, if the second key group is selected in response to the key-group selecting command, the function marker moving between the keys of the second key group is displayed. Here, the operation S93 may include operation of marking the function marker on a predetermined key of the second key group when the second key group is selected. At this time, the predetermined key of the second key group may correspond to at least one among a default key, a randomly selected key, a key just previously used by a user and a key used more frequently than a predetermined number of times.

According to an example embodiment, the operation S93 may include operation of displaying the function marker in the second key group and at least one dummy function marker moving between the keys of the second key group if the second key group is selected. That is, the dummy function marker moving randomly regardless of the key moving command may be displayed in addition to the function marker moving corresponding to the key moving command within the second key group. Thus, a third party cannot figure out the function marker moving corresponding to a user's input.

At operation S94, if a key marked with the function marker is selected, the function corresponding to the key is implemented. The operation S94 may include operation of displaying the input marker and at least one dummy marker in the first key group when the key marked with the function marker is selected. That is, in the state that the function marker moving corresponding to a user's input within the second key group is positioned at a specific key, if the specific key is selected in response to the key input command, the function corresponding to the specific key is implemented and then the first key group is immediately activated so that the input marker and the dummy marker can be displayed in the first key group. Thus, a third party cannot figure out which letter key the input is made corresponding to after selecting the function key.

As described above, according to an example embodiment, it is possible to prevent and/or avoid exposure of input information to a third party while a letter key input is made on an on-screen keyboard.

Further, according to an example embodiment, it is possible to prevent and/or avoid exposure of input information about a letter key being input when a letter key input is switched over to a function key input.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
a display;
an input comprising circuitry configured to receive a key moving command for moving between keys of an on-screen keyboard displayed on the display and a key-group selecting command for selecting a key group of the on-screen keyboard; and
a processor configured to control a user interface (UI) of the on-screen keyboard, the on-screen keyboard comprising a first key group including keys corresponding to a plurality of letters and a second key group including keys corresponding to a plurality of functions, to be displayed on the display, to control an input marker moving between first keys of the first key group in response to the key moving command and to control at least one dummy marker moving between second keys of the first key group to be displayed if the first key group is selected by the key-group selecting command, to control an input of the first key to be made if a first key corresponding to the input marker is selected corresponding, to control a function marker moving between keys of the second key group in response to the key moving command to be displayed if the second key group is selected by the key-group selecting command, and to control a function of a key to be implemented if the key corresponding to the function marker is selected.

2. The display apparatus according to claim 1, wherein the input comprises a remote controller comprising a plurality of buttons.

3. The display apparatus according to claim 1, wherein the processor is configured to control the function marker to be marked on a predetermined key of the second key group if the second key group is selected in response to the key-group selecting command.

4. The display apparatus according to claim 3, wherein the predetermined key of the second key group corresponds to at least one of: a default key, a randomly selected key, a key just previously used and a key used more frequently than a predetermined number of times.

5. The display apparatus according to claim 3, wherein the processor is configured to control the function marker in the second key group and to control the at least one dummy function marker moving between the keys of the second key group to be displayed if the second key group is selected by the key-group selecting command.

6. The display apparatus according to claim 1, wherein the processor is configured to control the input marker and to control at least one dummy marker to be displayed in the first key group if the key corresponding to the function marker is selected.

7. The display apparatus according to claim 1, wherein the processor is configured to control a region of the first key group where the input marker and to control at least one dummy marker are movable and a region of the second key group where the function marker is movable to be displayed on the UI of the on-screen keyboard.

8. The display apparatus according to claim 1, wherein the processor is configured to control the at least one dummy marker to move in a direction different from a direction in which the input marker moves within the first key group.

9. The display apparatus according to claim 1, wherein the processor is configured to control the at least one dummy marker to move successively in an ongoing second direction if the input marker moves two or more times successively in a first direction.

10. A method of controlling a display apparatus, the method comprising:
displaying a user interface (UI) including an on-screen keyboard, the on-screen keyboard comprising a first key group including keys corresponding to a plurality of letters and a second key group including keys corresponding to a plurality of functions;
receiving a key moving command for moving between keys of the on-screen keyboard displayed on the display;
displaying an input marker moving between first keys of the first key group in response to the key moving command and at least one dummy marker moving between second keys of the first key group if the first key group is selected by the key-group selecting command;
making an input of the first key if a first key corresponding to the input marker is selected;
displaying a function marker moving between keys of the second key group in response to the key moving command if the second key group is selected by the key-group selecting command; and
implementing a function of a key if the key corresponding to the function marker is selected.

11. The method according to claim 10, wherein the key moving command and the key-group selecting command are issued by a remote controller comprising a plurality of buttons.

12. The method according to claim 10, wherein the displaying the function marker comprises marking the function marker on a predetermined key of the second key group if the second key group is selected in response to the key-group selecting command.

13. The method according to claim 12, wherein the predetermined key of the second key group corresponds to at least one of: a default key, a randomly selected key, a key just previously used by a user and a key used more frequently than a predetermined number of times.

14. The method according to claim 12, further comprising: displaying the function marker in the second key group and displaying at least one dummy function marker moving between the keys of the second key group if the second key group is selected by the key-group selecting command.

15. The method according to claim 10, further comprising: displaying the input marker and the at least one dummy marker in the first key group if the key corresponding to the function marker is selected.

16. The method according to claim 10, further comprising: displaying a region of the first key group where the input marker and at least one dummy marker are movable and displaying a region of the second key group where the function marker is movable, on the UI of the on-screen keyboard.

17. The method according to claim 10, further comprising: controlling the at least one dummy marker to move in a direction different from a direction in which the input marker moves within the first key group.

18. The method according to claim 10, further comprising: controlling the at least one dummy marker to move successively in an ongoing second direction if the input marker moves two or more times successively in a first direction.

19. A computer program product comprising:
   a memory configured to store instructions;
   wherein the instructions, when executed by a computing device, cause the computing device:
   to control a user interface (UI) of an on-screen keyboard, the on-screen keyboard comprising a first key group including keys corresponding to a plurality of letters and a second key group including keys corresponding to a plurality of functions, to be displayed on a display,
   to control an input marker moving between first keys of the first key group in response to a key moving command and to control at least one dummy marker moving between second keys of the first key group to be displayed if the first key group is selected by a key-group selecting command,
   to control an input of the first key to be made if a first key corresponding to the input marker is selected, to control a function marker moving between keys of the second key group in response to the key moving command to be displayed if the second key group is selected by the key-group selecting command, and
   to control a function of a key to be implemented if the key corresponding to the function marker is selected.

20. The computer program product of claim 19, wherein the instructions are stored in the memory in a server and wherein the instructions are downloaded over a network to the computing device.

* * * * *